(12) United States Patent
Jones et al.

(10) Patent No.: US 9,529,710 B1
(45) Date of Patent: Dec. 27, 2016

(54) INTERLEAVED CHANNELS IN A SOLID-STATE DRIVE

(71) Applicants: Western Digital Technologies, Inc., Irvine, CA (US); Skyera, Inc., San Jose, CA (US)

(72) Inventors: Justin Jones, Burlingame, CA (US); Rodney N. Mullendore, San Jose, CA (US)

(73) Assignees: Western Digital Technologies, Inc., Irvine, CA (US); Skyera, LLC, San Jose, CA (US)

( * ) Notice: Subject to any disclaimer, the term of this patent is extended or adjusted under 35 U.S.C. 154(b) by 0 days.

(21) Appl. No.: 14/183,886

(22) Filed: Feb. 19, 2014

Related U.S. Application Data

(60) Provisional application No. 61/913,217, filed on Dec. 6, 2013.

(51) Int. Cl.
 G06F 12/00 (2006.01)
 G06F 13/00 (2006.01)
 G06F 12/02 (2006.01)

(52) U.S. Cl.
 CPC ................ G06F 12/0246 (2013.01)

(58) Field of Classification Search
 None
 See application file for complete search history.

(56) References Cited

U.S. PATENT DOCUMENTS

| | | |
|---|---|---|
| 6,856,556 B1 | 2/2005 | Hajeck |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,037,234 B2 | 10/2011 | Yu et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |

(Continued)

Primary Examiner — Sean D Rossiter
(74) Attorney, Agent, or Firm — Wilmer Cutler Pickering Hale and Dorr LLP

(57) ABSTRACT

A solid state drive (SSD) includes: non-volatile semiconductor memory (NVSM); a first plurality of flash controllers, each flash controller having a processor; and a second plurality of channels, each consecutive channel assigned to a different flash controller.

19 Claims, 4 Drawing Sheets

(56) References Cited

U.S. PATENT DOCUMENTS

| | | |
|---|---|---|
| 8,176,238 B2 | 5/2012 | Yu et al. |
| 8,243,525 B1 | 8/2012 | Kan |
| 8,254,172 B1 | 8/2012 | Kan |
| 8,261,012 B2 | 9/2012 | Kan |
| 8,266,367 B2 | 9/2012 | Yu et al. |
| 8,285,919 B2 | 10/2012 | Luo et al. |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,332 B2 | 12/2012 | Ma et al. |
| 8,341,339 B1 | 12/2012 | Boyle et al. |
| 8,355,279 B2 | 1/2013 | Yoon et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,844 B2 | 4/2013 | Lin |
| 8,433,858 B1 | 4/2013 | Diggs et al. |
| 8,443,167 B1 | 5/2013 | Fallone et al. |
| 8,447,920 B1 | 5/2013 | Syu |
| 8,448,018 B2 | 5/2013 | Jeddeloh |
| 8,458,435 B1 | 6/2013 | Rainey, III et al. |
| 8,478,930 B1 | 7/2013 | Syu |
| 8,489,854 B1 | 7/2013 | Colon et al. |
| 8,495,324 B2 | 7/2013 | Kirvan et al. |
| 8,495,471 B2 | 7/2013 | Antonakopoulos et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2008/0126682 A1* | 5/2008 | Zhao et al. .................. 711/103 |
| 2009/0204872 A1 | 8/2009 | Yu et al. |
| 2009/0240873 A1 | 9/2009 | Yu et al. |
| 2010/0174849 A1 | 7/2010 | Walston et al. |
| 2010/0250793 A1 | 9/2010 | Syu |
| 2010/0262762 A1* | 10/2010 | Borchers et al. ............ 711/103 |
| 2011/0072195 A1 | 3/2011 | Lin |
| 2011/0099323 A1 | 4/2011 | Syu |
| 2011/0213921 A1 | 9/2011 | Yu et al. |
| 2011/0283049 A1 | 11/2011 | Kang et al. |
| 2012/0239976 A1 | 9/2012 | Cometti et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0132643 A1 | 5/2013 | Huang |
| 2013/0135816 A1 | 5/2013 | Huang |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

* cited by examiner

INTERLEAVED CHANNELS IN A SOLID-STATE DRIVE

CROSS-REFERENCE TO RELATED APPLICATION(S)

This application claims the benefit of U.S. provisional application No. 61/913,217, filed Dec. 6, 2013, the disclosure of which is hereby incorporated in its entirety by reference.

BACKGROUND

Technical Field

Apparatuses and methods consistent with the present inventive concept relate generally to data storage devices and in particular to interleaving channels in a solid state data storage device.

Related Art

A data storage system may include various volatile and non-volatile storage devices such as a hard disk drive (HDD), an optical storage drive, and a solid state drive (SSD). An SSD provides increased throughput capability due to its parallel architecture incorporating a plurality of solid-state memory devices (e.g., NAND flash memory devices) and data striping across the plurality of memory devices. FIG. 1 illustrates a representative solid state memory device.

Referring to FIG. 1, a solid-state memory device 100 includes a plurality of blocks 110 with each block including a plurality of pages 120. The blocks in the solid-state memory device 100 may be divided into planes of even-numbered blocks 130 and odd-numbered blocks 140. In an example embodiment, there are 2,048 blocks per memory device with 16 memory devices configured in each of 16 channels, one channel providing access to an active memory device of the 16 memory devices in that channel.

In an SSD, a flash memory controller controls read and write operations to and from the plurality of memory devices. Since an SSD may contain 256 or more solid state memory devices, the resulting load on the flash memory controller can negatively impact data throughput.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Overview

Some embodiments of the present inventive concept involve interleaving channels in an SSD, with sub-groups of channels controlled by separate flash controllers to provide load balancing in the usage of the solid-state non-volatile memory device channels.

Figure 2:
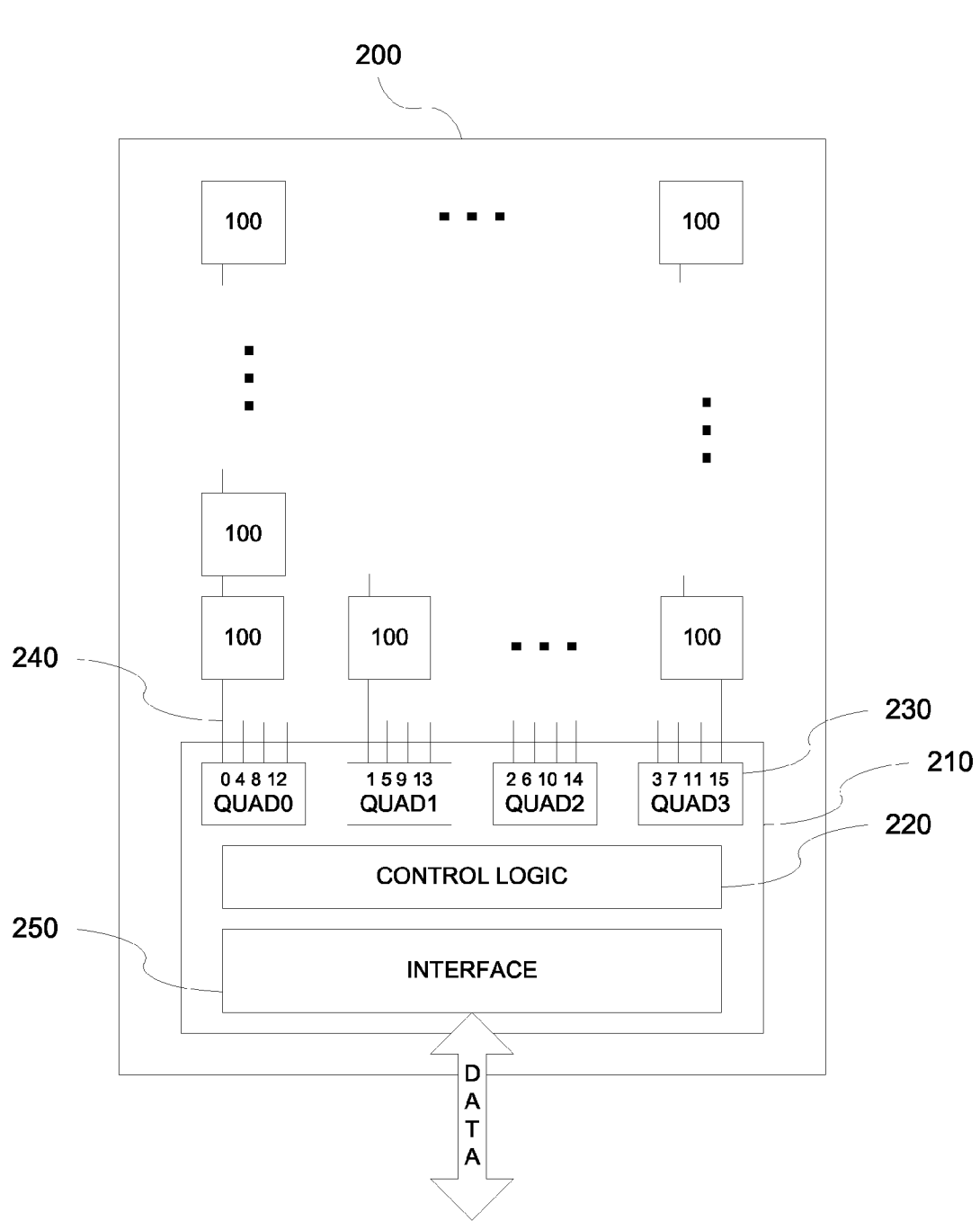
FIG. 2 is a block diagram illustrating an SSD according to an example embodiment of the present inventive concept.

FIG. 2 is a block diagram illustrating an SSD according to an example embodiment of the present inventive concept. Referring to FIG. 2, in one implementation an SSD 200 may include a plurality of solid-state memory devices 100, for example, 256 memory devices arranged in 16 memory channels of 16 memory devices in each channel, and an SSD controller 210. The solid-state memory devices 100 may be, for example but not limited to, flash memory devices or other non-volatile solid-state memory (NVSM) devices. Throughout this disclosure, the solid-state memory devices may be referred to interchangeably as solid-state memory devices, flash memory devices, and NVSM devices, all of which will be understood to mean the memory devices of the present inventive concept. The SSD controller 210 may include control logic 220, a plurality of flash controller quads 230 (Quad0-Quad3), and an interface 250.

Data and commands to and from the SSD 200 may be communicated through the interface 250. The control logic may include a processor (e.g., a central processing unit (CPU)), and overall operation of the SSD 200 may be controlled by the control logic 220.

Groups of the solid-state memory devices 100 may be connected in memory channels 240 through which read and write operations to and from individual solid-state memory devices 100 are performed. In terms of a matrix of memory devices, each column of memory devices may constitute a memory channel. Alternatively, each row of memory devices may constitute a memory channel. Each of the plurality of flash controller quads 230 may include its own CPU and controls data reads and writes to a plurality of memory channels 240.

Interleaving Channels in an SSD

Figure 1:
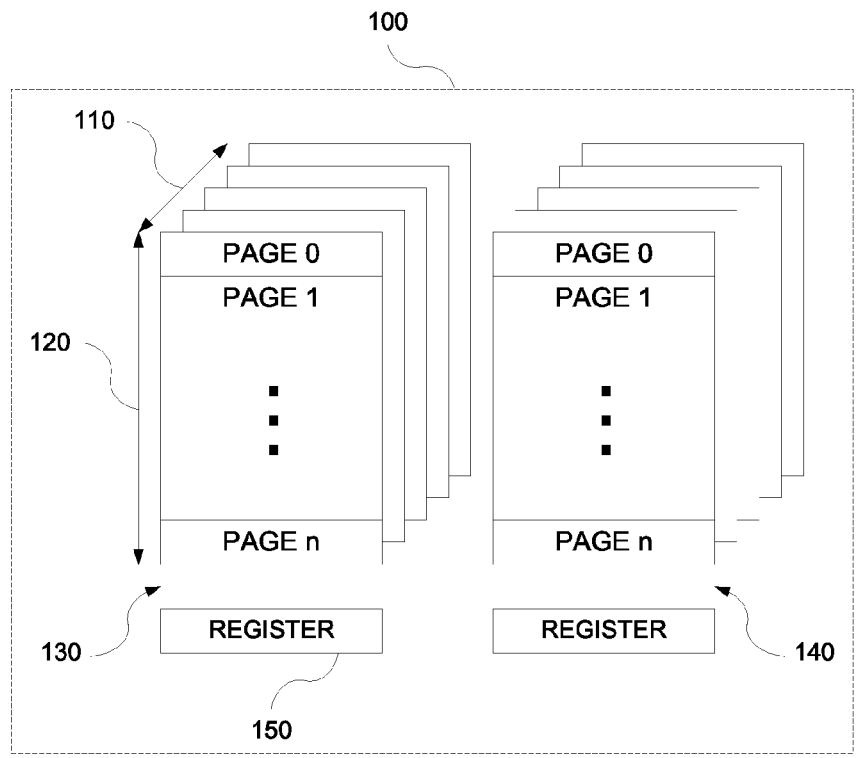
FIG. 1 is an illustration of a representative solid state memory device according to an example embodiment of the present inventive concept.
Figure 3:
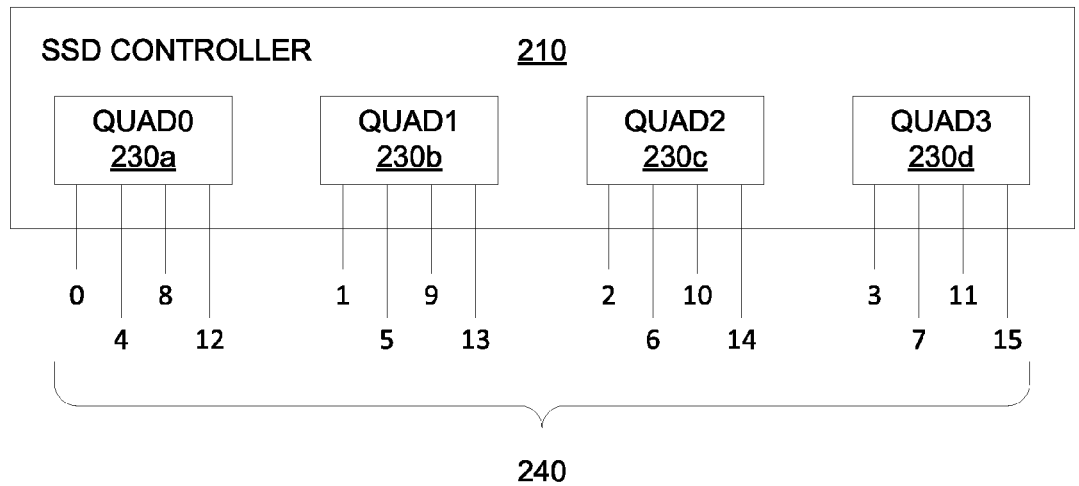
FIG. 3 is a block diagram illustrating a plurality of flash controller quads in an SSD controller according to an example embodiment of the present inventive concept.

FIG. 3 is a block diagram illustrating a plurality of flash controller quads in an SSD controller according to an example embodiment of the present inventive concept. In the example embodiment illustrated in FIG. 3, each flash controller quad 230a-230d contains a CPU and controls data reads and writes to four memory channels 240. One of ordinary skill in the art will appreciate that the number of memory channels controlled by a flash controller quad may be more or less than four without departing from the scope of the present inventive concept. It should also be noted that the use of the term "controller quad" is for illustrative purposes only in these example 4-channel embodiments and that other embodiments may use flash controller processors/control units that control any number of memory channels.

The memory channel numbers controlled by each flash controller quad 230a-230d for an SSD having 4, 8, or 16 flash channels are described in Table 1 below. As illustrated in FIG. 3 and shown in Table 1, the memory channels are interleaved in order to distribute flash read/write activity across the plurality of flash controller quads 230a-230d (Quad0-Quad3).

TABLE 1

| Memory Channels | Flash Quads | Memory Channel Numbers in Flash Quads |
| --- | --- | --- |
| 16 | 4 | Quad0 has Channels 0, 4, 8, and 12 |
|  |  | Quad1 has Channels 1, 5, 9, and 13 |
|  |  | Quad2 has Channels 2, 6, 10, and 14 |
|  |  | Quad3 has Channels 3, 7, 11, and 15 |
| 8 | 2 | Quad0 has Channels 0, 2, 4, and 6 |
|  |  | Quad1 has Channels 1, 3, 5, and 7 |
| 4 | 1 | Quad0 has Channels 0, 1, 2, and 3 |

Since each sequential flash channel is controlled by a different flash controller quad, for example, memory channel 0 is controlled by quad0, memory channel 1 is controlled by quad1, etc., and since the channels are accessed in an order consistent with the channel numbers assigned, the workload for the CPU in each flash controller quad is naturally distributed.

Also, because the host processor is generally reading from the memory devices in the same order as it is writing to the memory devices, naturally distributing writes in this manner will also help with the distribution of reads. The embodiments of the present inventive concept provide parallelism which reduces resource congestion.

Figure 4:
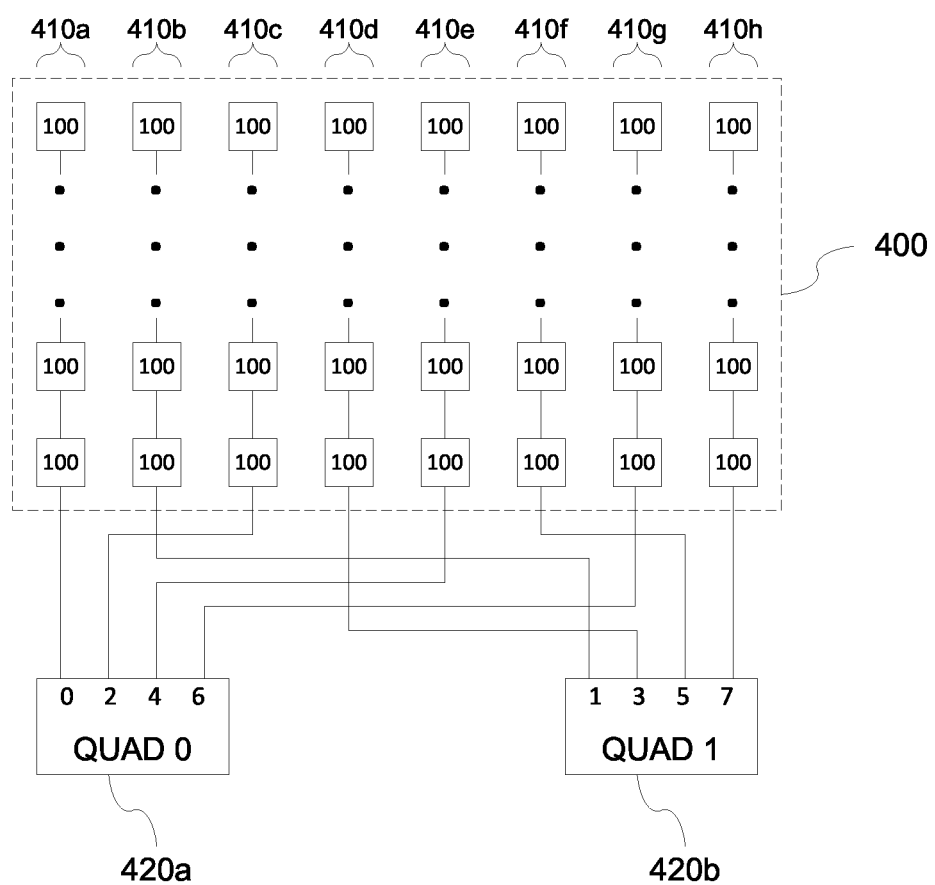
FIG. 4 is a block diagram illustrating an SSD having eight memory channels and two flash controller quads according to an example embodiment of the present inventive concept.

FIG. 4 is a block diagram illustrating an SSD having eight memory channels and two flash controller quads according to an example embodiment of the present inventive concept. As illustrated in FIG. 4, a memory array 400, for example, but not limited to, a NVSM, includes a plurality of solid-state memory devices 100. The plurality of solid-state memory devices 100 may be arranged logically and/or physically in a matrix having rows and columns. Portions of the memory array 400 may be assigned to memory channels. In the example embodiment illustrated in FIG. 4, each column 410a-410h of sequentially connected memory devices 100 corresponds to a memory channel controlled by one of the flash controller quads 420a, 420b.

Referring to Table 1, for an SSD configuration having eight memory channels and two flash controller quads, quad0 controls memory channels 0, 2, 4, and 6, while quad1 controls memory channels 1, 3, 5, and 7. Referring again to FIG. 4, each consecutive channel 0-7 is assigned to a different flash controller: flash controller quad 420a controls memory channels 0, 2, 4, and 6, and flash controller quad 420b controls memory channels 1, 3, 5, and 7. Since data is written to the channels sequentially, i.e., first to channel 0, then to channel 1, then to channel 2, etc., over time the programming load is distributed over the plurality of flash controllers.

Figure 5:
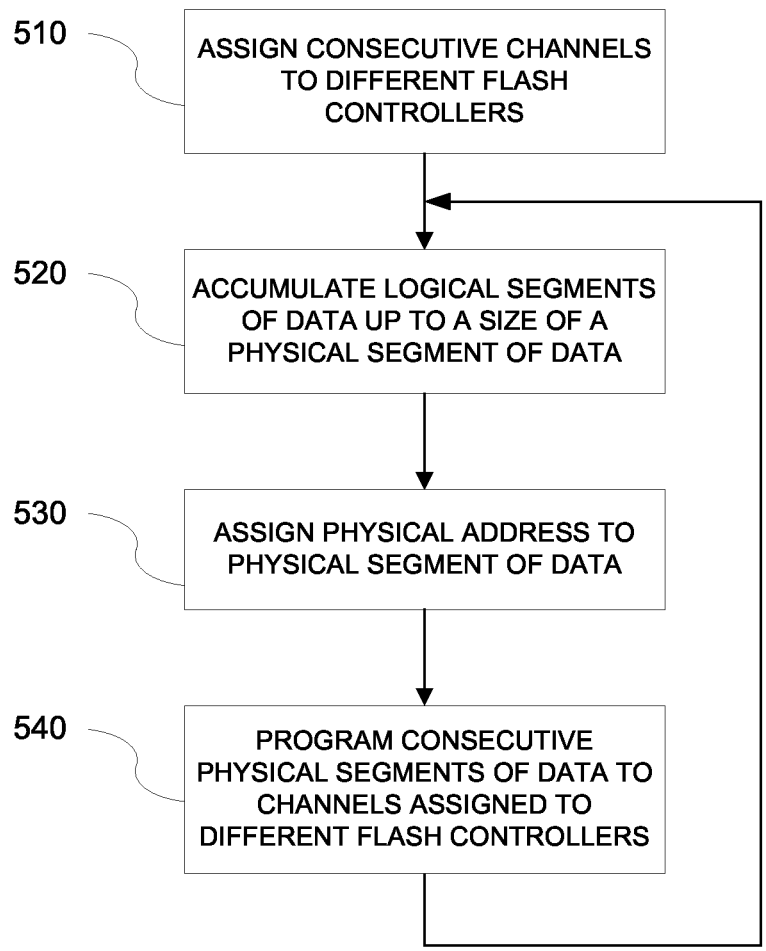
FIG. 5 is a flowchart illustrating a method according to an example embodiment of the present inventive concept.

FIG. 5 is a flowchart illustrating a method according to an example embodiment of the present inventive concept.

Referring to FIG. 5, as described in Table 1 and illustrated in FIG. 4 eight consecutive memory channels are assigned to different flash controllers (510). Logical segments of data (logical pages, or L-pages of data) are accumulated, regardless of order, up to the size of a physical segment of data (a flash-page, or F-page of data) (520). An L-page is a logical segment of data equivalent to 4 kilobytes (KB) of data. One of ordinary skill in the art will appreciate that L-pages having more or less than 4 KB of data are possible without departing from the scope of the present inventive concept. An F-page is a physical segment of data equivalent to 16 kilobytes (KB) of data. One of ordinary skill in the art will appreciate that F-pages having more or less than 16 KB of data are possible without departing from the scope of the present inventive concept.

The SSD control logic assigns a physical address to the physical segment of data corresponding to a memory device in a portion of the NVSM assigned to a next consecutive channel (530). The accumulated data is programmed to the memory device by the flash controller assigned to the next consecutive channel in logical order (540). Thus, accumulated data is programmed to a memory device assigned to a first channel, then to a memory device assigned to a second channel, and so forth, such that the programming load is distributed over the plurality of flash controllers over time.

The example embodiments disclosed herein can be applied to solid state drives, hybrid hard drives, and the like. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. In addition, other forms of storage, for example, but not limited to, DRAM or SRAM, battery backed-up volatile DRAM or SRAM devices, EPROM, EEPROM memory, etc., may additionally or alternatively be used. As another example, various components illustrated in the figures may be implemented as software and/or firmware on a processor, ASIC/FPGA, or dedicated hardware. Also, the features and attributes of the specific example embodiments disclosed above may be combined in different ways to form additional embodiments, all of which fall within the scope of the present disclosure.

While certain embodiments have been described, these embodiments have been presented by way of example only, and are not intended to limit the scope of the protection. The methods and systems described herein may be embodied in a variety of other forms. Various omissions, substitutions, and/or changes in the form of the example methods and systems described herein may be made without departing from the spirit of the protection.

Other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A solid state drive (SSD), comprising:
   non-volatile semiconductor memory (NVSM) comprising a plurality of solid state memory devices;
   an SSD controller comprising a plurality of flash controllers; and
   a plurality of channels, wherein a number of the plurality of channels is greater than a number of the plurality of flash controllers, wherein each of the plurality of channels is coupled to at least one of the plurality of solid state memory devices, wherein each of the plurality of channels is assigned a unique channel number, and
   wherein every pair of channels assigned to two consecutive channel numbers are assigned to a different one of the plurality of flash controllers to interleave the channels, and
   wherein the SSD controller is configured to:
      accumulate logical segments of data up to a size of a physical segment of data, and
      sequentially program consecutive physical segments of data to channels assigned to two consecutive channel numbers to distribute a programming load over the plurality of flash controllers.

2. The SSD of claim 1, wherein a pair of channels assigned to two consecutive channel numbers are assigned to consecutive flash controllers.

3. The SSD of claim 1, wherein the SSD is further configured to accumulate the logical segments of data and assign a physical address to the physical segment of data, the physical address corresponding to a memory device in a portion of the NVSM assigned to a channel with a next channel number.

4. The SSD of claim 3, wherein the physical segment of data is programmed to the memory device by the flash controller assigned to the channel with the next channel number.

5. The SSD of claim 1, wherein the NVSM comprises a plurality of solid state memory devices arranged in a matrix having a plurality of rows and columns.

6. The SSD of claim 5, wherein one of the plurality of columns comprises a channel.

7. The SSD of claim 5, wherein one of the plurality of rows comprises a channel.

8. A method for operating a solid state drive (SSD) comprising non-volatile semiconductor memory (NVSM) having a plurality of solid state memory devices, an SSD controller comprising a plurality of flash controllers, and a plurality of channels, wherein a number of the plurality of channels is greater than a number of the plurality of flash controllers, wherein each of the plurality of channels is coupled to at least one of the plurality of solid state memory devices, wherein each of the plurality of channels is assigned a unique channel number, the method comprising:
  assigning every pair of channels assigned to two consecutive channel numbers to a different one of the plurality of flash controllers to interleave the channels,
  accumulating logical segments of data up to a size of a physical segment of data, and
  sequentially programming consecutive physical segments of data to channels assigned to two consecutive channel numbers to distribute a programming load over the plurality of flash controllers.

9. The method of claim 8, further comprising assigning a physical address to the physical segment of data, the physical address corresponding to a memory device in the NVSM assigned to a channel with a next channel number.

10. The method of claim 8, wherein the programming the physical segment of data comprises programming the physical segment of data by the flash controller assigned to the channel with the next channel number.

11. The method of claim 8, wherein the NVSM comprises a plurality of solid state memory devices arranged in a matrix having a plurality of rows and columns.

12. The method of claim 11, wherein one of the plurality of columns comprises a channel.

13. The method of claim 11, wherein one of the plurality of rows comprises a channel.

14. A data storage system, comprising:
a data storage controller; and
a solid state drive (SSD), comprising:
  non-volatile semiconductor memory (NVSM) comprising a plurality of solid state memory devices;
  a plurality of flash controllers; and
  a plurality of channels, wherein a number of the plurality of channels is greater than a number of the plurality of flash controllers, wherein each of the plurality of channels is coupled to at least one of the plurality of solid state memory devices, and wherein each of the plurality of channels is assigned a unique channel number, wherein every pair of channels assigned to two consecutive channel numbers are assigned to a different one of the plurality of flash controllers to interleave the channels, and
wherein the plurality of flash controllers is configured to program consecutive physical segments of data to one of the plurality of solid state memory devices via channels assigned to two consecutive channel numbers to distribute a programming load over the plurality of flash controllers.

15. The data storage system of claim 14, wherein:
the data storage controller is configured to accumulate logical segments of data up to a size of a physical segment of data,
the data storage controller is configured to assign each physical segment of data a physical address, the physical address corresponding to one of the plurality of solid state memory devices assigned to a channel with a next channel number, and
the flash controller, to which the channel with the next channel number is assigned, is configured to program the physical segment of data to the physical address in the one of the plurality of solid state memory devices assigned to the channel with the next channel number.

16. The data storage system of claim 14, wherein the plurality of solid state memory devices are arranged in a matrix having a plurality of rows and columns.

17. The data storage system of claim 16, wherein one of the plurality of columns comprises a channel.

18. The data storage system of claim 16, wherein one of the plurality of rows comprises a channel.

19. The data storage system of claim 14, wherein the data storage controller comprises the plurality of flash controllers.

* * * * *